United States Patent
He et al.

(10) Patent No.: US 6,671,789 B1
(45) Date of Patent: Dec. 30, 2003

(54) METHOD AND APPARATUS FOR DETERMINING UNKNOWN RELATIONSHIPS BETWEEN STORAGE DEVICES AND STORAGE DEVICE ENCLOSURES

(75) Inventors: Zhengwen He, Rochester, MN (US); Gregory J. Knight, Rochester, MN (US); William Roy Yonker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,612

(22) Filed: May 4, 2000

(51) Int. Cl.[7] .......................... G06F 12/00; G06F 13/00
(52) U.S. Cl. ...................... 711/170; 711/100; 711/154; 709/221
(58) Field of Search .............................. 711/100, 170, 711/171, 172, 173; 709/200, 220, 221, 226, 229; 714/5; 702/188

(56) References Cited

U.S. PATENT DOCUMENTS

| | | | | |
|---|---|---|---|---|
| 5,469,560 A | * | 11/1995 | Beglin .......................... | 711/112 |
| 5,822,782 A | * | 10/1998 | Humlicek et al. ........... | 711/170 |
| 5,838,891 A | * | 11/1998 | Mizuno et al. ................ | 714/5 |
| 5,930,817 A | * | 7/1999 | Mizuno et al. .............. | 711/114 |
| 6,188,973 B1 | * | 2/2001 | Martinez et al. ............ | 702/188 |
| 6,343,324 B1 | * | 1/2002 | Hubis et al. ................. | 709/229 |

* cited by examiner

*Primary Examiner*—Tuan V. Thai
*Assistant Examiner*—Thang H Ho
(74) *Attorney, Agent, or Firm*—James R. Nock

(57) ABSTRACT

Method, program product, and system for the probabilistic determination of storage device enclosure-to-storage device relationships in a storage system, when the exact relationship is unknown. A table is built at storage system startup representing the initial storage device enclosure to storage device relationship. For efficiency, as topology changes occur within the storage system, the table is not updated to reflect the topology change. When a user wishes to access a specific storage device enclosure, the table is opened, and the most recently added storage device entry for the selected enclosure is chosen. The chosen storage device is queried for its current physical location. If the storage device still resides within the selected enclosure, the user access the enclosure via the chosen storage device. If the chosen storage device does not reside within the disclosure, the storage device entry is moved to the enclosure entry where it now resides, and the next most recently added storage device within the selected enclosure entry is chosen. The storage device select/query process is repeated until a storage device referenced by the chosen storage device entry is determined to reside within the selected enclosure. If the list of storage devices for the selected enclosure entry is exhausted, the table is rebuilt.

10 Claims, 19 Drawing Sheets

550 Enclosure Access Table

| ENCLOSURE | DISKS | 554 | |
|---|---|---|---|
| Enclosure 1 | Disk 1 | Disk 2 | Disk 3 |
| Enclosure 2 | Disk 12 | Disk 13 | Disk 14 |
| Enclosure 3 | Disk 23 | Disk 24 | Disk 25 |
| Enclosure 4 | Disk 34 | Disk 35 | Disk 36 |
| Enclosure 5 | Disk 45 | Disk 46 | Disk 47 |
| Enclosure 6 | Disk 56 | Disk 57 | Disk 58 |
| Enclosure 7 | Disk 67 | Disk 68 | Disk 69 |
| Enclosure n | Disk 78 | Disk 79 | Disk 80 |

| Disk 4 | Disk 5 | Disk 6 | Disk 7 |
| --- | --- | --- | --- |
| Disk 15 | Disk 16 | Disk 17 | Disk 18 |
| Disk 26 | Disk 27 | Disk 28 | Disk 29 |
| Disk 37 | Disk 38 | Disk 39 | Disk 40 |
| Disk 48 | Disk 49 | Disk 50 | Disk 51 |
| Disk 59 | Disk 60 | Disk 61 | Disk 62 |
| Disk 70 | Disk 71 | Disk 72 | Disk 73 |
| Disk 81 | Disk 82 | Disk 83 | Disk 84 |

FIG. 7B

| Enclosure 602B | Disk 1 | Disk 2 | ///Disk 3/// | ///Disk 4/// | |
|---|---|---|---|---|---|
| Enclosure 604B | ///Disk 5/// | ///Disk 6/// | | | |
| Enclosure 606B | Disk 7 | Disk 8 | Disk 9 | | |
| Enclosure 608B | Disk 10 | Disk 11 | Disk 12 | | |
| ⋮ | | | | | |

610B

| Enclosure 602B | Disk 1 | Disk 2 | ///Disk 3/// | ///Disk 4/// | |
|---|---|---|---|---|---|
| Enclosure 604B | ///Disk 5/// | ///Disk 6/// | | | |
| Enclosure 606B | Disk 7 | Disk 8 | Disk 9 —728 | | |
| Enclosure 608B | Disk 10 | Disk 11 | Disk 12 | | |
| ⋮ | | | | | |

METHOD AND APPARATUS FOR DETERMINING UNKNOWN RELATIONSHIPS BETWEEN STORAGE DEVICES AND STORAGE DEVICE ENCLOSURES

TECHNICAL FIELD

This invention relates generally to the determination of unknown relationships between storage devices and storage device enclosures and, more specifically, to the efficient, probabilistic determination of which storage devices reside in a storage device enclosure, when the storage device enclosure itself cannot be directly addressed.

BACKGROUND OF THE INVENTION

Data is the underlying resource on which all computing processes are based. Data is stored on storage devices, and these devices are accessed by applications based on a computer server. Examples of storage devices include, but are not limited to, hard disk drives, optical disk drives, tape drives and memory storage devices. Historically, the management of storage was centralized with storage devices directly connected to a host computer, and managed by the information technology (IT) department.

New data-intensive applications, such as the Internet and e-business, have fueled explosive growth in the demand for data storage, creating formidable storage management requirements. With the advent of client/server computing, a multitude of storage devices are dispersed and connected to individual machines in far flung networks. These "islands" of information are often hard to access from other islands.

In response to the problems presented by client/server environments, Storage Area Networks (SANs) have evolved. A SAN is a high-speed network dedicated to information management. More formally, a SAN is a combination of technologies—including hardware, software and networking components—that provides any-to-any interconnection of server and storage elements.

SANs are based on a "fabric" of Fibre Channel hubs, switches and gateways connecting storage devices—such as storage device (e.g., disk drive) enclosures, optical disks or tape libraries—and servers on a many-to-many basis. Application and transaction servers are attached to both the SAN and to Local Area Networks (LANs) or Wide Area Networks (WANs), creating what appears to be a massive pool of data.

SANs typically include one or more storage device enclosures, connected to one or more host computers via a link such as a Small Computer System Interface (SCSI) bus, or Serial Storage Architecture (SSA) loop. A storage device enclosure is an external box (or bay), typically larger than the main computer enclosure, which holds multiple physical storage devices (usually more than the computer proper can hold internally). Storage device enclosures often provide redundant power supplies and fans that can be replaced without impacting system operation. If a storage device failure occurs, hot-swappable drives can be removed and replaced without disrupting the communication between the host computer adapter and other storage devices on the loop.

Typically, a server computer can determine, by addressing a storage device, which storage device enclosure the storage device resides in. But, a storage device enclosure cannot be directly addressed by a server computer to determine which storage devices reside in a storage device enclosure. Thus, in a two entity relationship (i.e. entity A being the storage device, and entity B being the storage device enclosure), the A to B relationship can be directly determined, but the B to A relationship cannot be directly determined.

In order to continuously monitor operational characteristics of the storage device enclosure such as internal temperature, fan status, power supply status, and storage device slot status, it is vital for a server computer to quickly and efficiently access a specific storage device enclosure. In order to determine the storage devices residing within a specific storage device enclosure, the server computer must build an enclosure access table, which contains the enclosure-to-storage device relationship.

In order to build the enclosure access table, each storage device must be individually queried by the host computer to determine in which enclosure the storage device resides. A storage configuration may contain dozens of enclosures containing hundreds of storage devices. Since each storage device query operation may take up to several seconds under certain operating conditions, the building of the enclosure access table is a very slow operation, severely affecting system performance.

During operation of the storage system, storage devices can be added, removed, or exchanged to/from the various storage device enclosures. Maintenance of the enclosure access table incurs a huge performance penalty, since for every (generic) topology change, the server computer must re-query each storage device in order to determine in which enclosure it now resides.

Thus, there is a need for an apparatus and method for quickly determining which storage device is most likely to reside in a given storage device enclosure, when the exact relationship between storage devices and enclosures is not known. The method and apparatus should operate without requiring an inefficient rebuild of the enclosure access table upon each storage device topology change within the storage system. These and other objects, features and advantages of the present invention will be further described and more readily apparent from the summary, detailed description and preferred embodiments, the drawing and the claims which follow.

SUMMARY OF THE INVENTION

The invention is a method, program product, and system for the probabilistic determination of storage device enclosure-to-storage device relationships in a storage system when the exact relationship is unknown. Operators cannot communicate directly with storage device enclosures, but can indirectly communicate with storage device enclosures via a storage device residing in the storage device enclosure. Operators need to communicate with storage device enclosures in order to monitor operating parameters of the enclosure. By predicting which storage device is most likely to reside within a selected disclosure, an operator is able to communicate with the storage device enclosure via the identified storage device. The invention eliminates the inefficiencies of completely rebuilding an enclosure-to-storage device relationship table upon each topology change within the storage system.

In a preferred embodiment, an enclosure access table is built at system startup which represents the initial representation of which storage devices reside within each of the storage device enclosures. In order to build the enclosure access table, each storage device must be queried to determine in which enclosure it resides. If a topology change occurs within the storage device system, the enclosure access table is not rebuilt, because of the large performance penalty involved. When an operator wishes to access a specific enclosure, the enclosure access table is opened, and the most recently added storage device entry for the selected enclosure is chosen. The chosen storage device is queried for its current physical location. If the chosen storage device still resides within the selected enclosure, the operator begins communication with the selected enclosure via the chosen storage device. If the chosen storage device does not currently reside within the selected enclosure, the storage device entry is removed from the entry for the selected enclosure, and added to the entry for the enclosure where it currently resides. The next storage device is then chosen for the selected enclosure, and the process is repeated until a storage device referenced by the storage device entry is determined to physically reside within the selected enclosure. If the list of storage device entries for an enclosure in the enclosure access table is exhausted, the enclosure access table is rebuilt.

The claimed invention offers the advantage of avoiding the rebuild of the enclosure-to-storage device mapping table upon each topology change in a storage device storage system, significantly enhancing storage system performance. The present invention also offers the advantage of being easily implementable within a wide variety of storage systems, in hardware, firmware, or software.

DETAILED DESCRIPTION OF THE INVENTION

Figure 1:
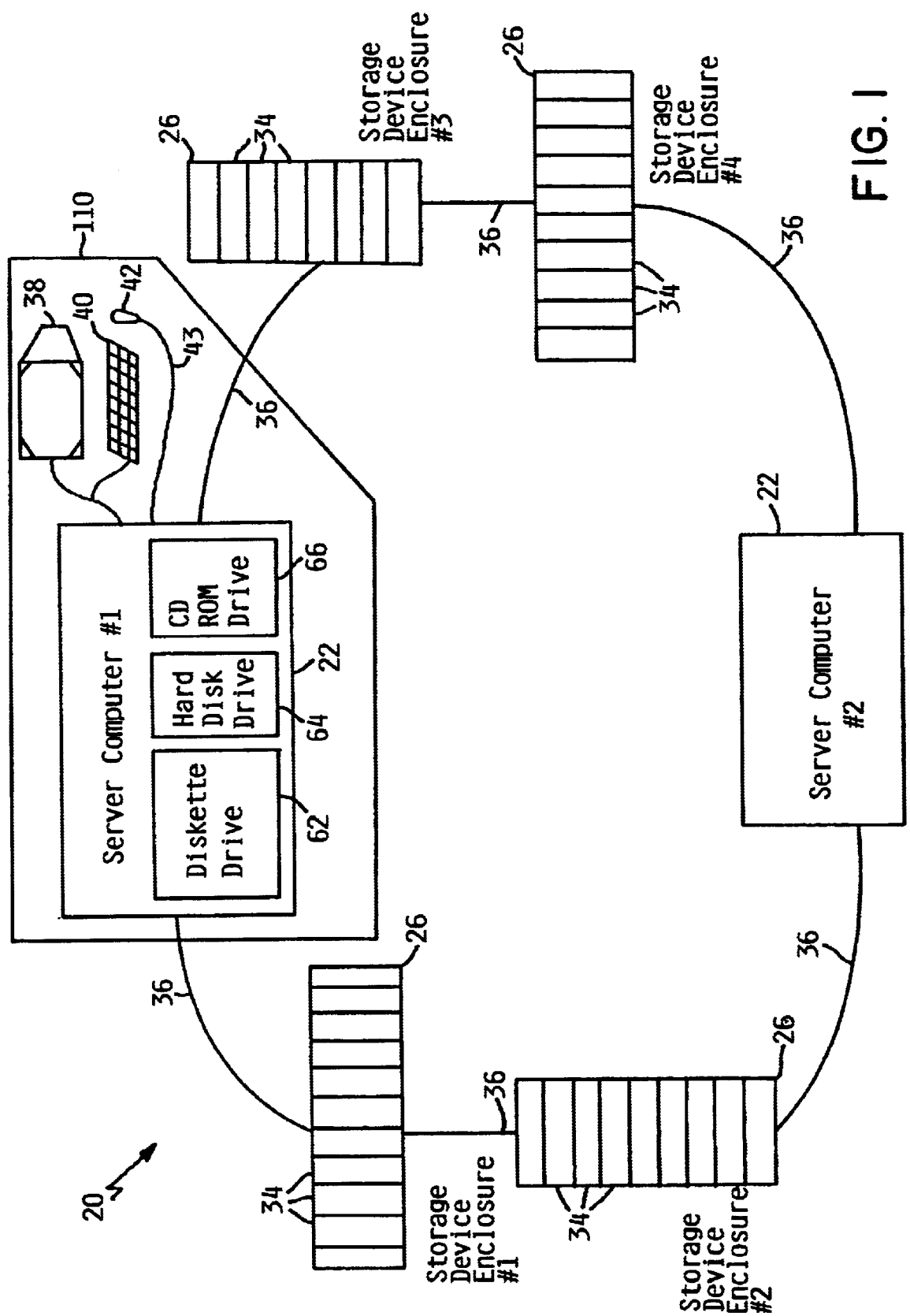
FIG. 1 is a pictorial representation of a computing environment in which a preferred embodiment is implemented.

With reference now to the figures and in particular with reference to FIG. 1, there is depicted an embodiment of a computing environment 20 that can be utilized to implement the preferred embodiment.

Computing environment 20 includes a plurality of server computers 22 and storage device enclosures 26 interconnected via a network 36. In a preferred embodiment, network 36 is a Serial Storage Architecture (SSA), originally introduced by IBM Corporation in 1991. SSA is primarily an architecture for device attachment within subsystems, but is also used to connect devices (such as storage device enclosures 26) to server computers 22. SSA uses a loop rather than a bus as its interconnection medium. The SSA loop architecture includes two simultaneous read and two simultaneous write paths, with each of the four paths having 40 MB/sec bandwidth. Within the SSA loop design, a single cable failure will not cause loss of access to data. If a cable failure occurs on the loop, the SSA adapter automatically continues accessing storage devices through an alternate path. If a storage device failure occurs, a hot-swappable storage device drive 34 can be removed and replaced without disrupting the communication between the storage device enclosure adapter and other storage devices on the SSA loop. SSA currently allows for up to 127 drives per loop and will scale to multiple terabytes. It is contemplated that a number of alternative storage network architectures in addition to SSA can be employed within the scope of the present invention.

Server computer 22 includes a display device 38, a keyboard 40, a pointing device 42, and local area network interfaces (not illustrated). Keyboard 40 is part of server computer 22 that resembles a typewriter keyboard and enables a user to control particular aspects of server computer 22. Because information flows in one direction, from keyboard 40 to server computer 22, keyboard 40 functions as an input-only device. Functionally, keyboard 40 represents half of a complete input/output device, the output half being video display terminal 38. Keyboard 40 includes a standard set of printable characters presented in a "QWERTY" pattern typical of most typewriters. It is from keyboard 40 where an operator can issue commands to monitor and manage storage device enclosures 26.

Video-display terminal 38 is the visual output of server computer 22. As indicated herein, video-display terminal 38 can be a cathode-ray tube (CRT) based video display well-known in the art of computer hardware. But, in alternative embodiments, video-display terminal 38 can be replaced with a liquid crystal display (LCD) based or gas, plasma-based, flat-panel display. An operator can monitor the status of storage device enclosures via video display terminal 38.

Pointing device 40 is preferably utilized in conjunction with a graphical user-interface (GUI) in which hardware components and software objects are controlled through the selection and the manipulation of associated, graphical objects displayed within video display terminal 38. Although server computer 22 is illustrated with a mouse for pointing device 40, other graphical-pointing devices such as a graphic tablet, joystick, track ball, touch pad, or track pad could also be utilized. Pointing device 40 features a casing with a flat bottom that can be gripped by a human hand. Pointing device 40 can include buttons on the top, a multidirectional-detection device such as a ball on the bottom, and cable 43 that connects pointing device 40 to server computer 22.

To support local storage and retrieval of data, server computer 22 further includes local diskette drive 62, hard-disk drive 64, and CD-ROM drive 66, which are interconnected with other components of server computer 22, and which are further described below under the description for FIG. 2.

Computing environment 20 can be implemented utilizing any number of suitable server computers 22 (e.g., server computers running UNIX or Microsoft Windows NT) or storage enclosures 26 (e.g., IBM Serial Disk System). But, a preferred embodiment of the present invention can apply to any hardware configuration that allows execution of a method for determining unknown relationships between storage device enclosures and storage devices, regardless of whether the computer system is a complicated, multi-user computing apparatus, a single-user-workstation, or a network appliance that does not have non-volatile storage of its own.

Figure 2:
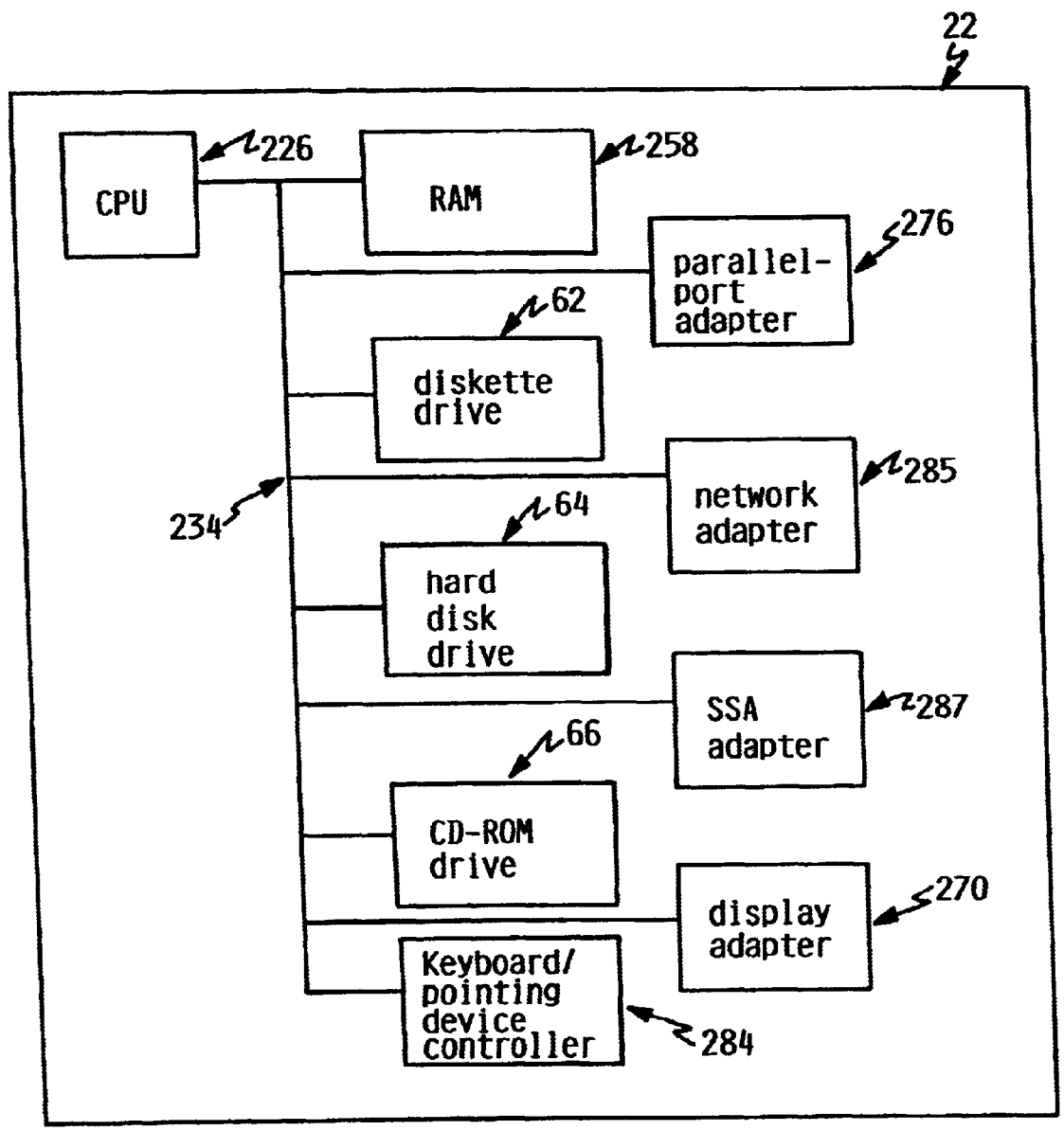
FIG. 2 is a block diagram of a representative hardware environment of a server computer of the computing environment illustrated in FIG. 1.

Referring to FIG. 2, there is depicted a block diagram of the principal components of server computer 22. CPU 226 is connected via system bus 234 to RAM (Random Access Memory) 258, diskette drive 62, hard-disk drive 64, CD-ROM drive 66, keyboard/pointing-device controller 284, parallel-port adapter 276, network adapter 285, display adapter 270, and SSA adapter 287. Although the various components of FIG. 2 are drawn as single entities, each may consist of a plurality of entities and may exist at multiple levels.

Server computer includes central processing unit (CPU) 226, which executes instructions. CPU 226 includes the portion of server computer 22 that controls the operation of the entire server computer, including executing the arithmetical and logical functions contained in a particular computer program. Although not depicted in FIG. 2, CPU 226 typically includes a control unit that organizes data and program storage in a computer memory and transfers the data and other information between the various parts of the server computer. CPU 226 generally includes an arithmetic unit that executes-the arithmetical and logical operations, such as addition, comparison, and multiplication. CPU 226 accesses data and instructions from and stores data to volatile RAM 258.

CPU 226 can be implemented as one of the 80×86 or Pentium processors, or any other type of processor, which are available from a number of vendors. Although server computer 22 is shown to contain only a single CPU and a single system bus, the present invention applies equally to server computers that have multiple CPUs and to server computers that have multiple buses that each perform different functions in different ways.

RAM 258 comprises a number of individual, volatile-memory modules that store segments of operating system and application software while power is supplied to server computer 22. The software segments are partitioned into one or more virtual-memory pages that each contain a uniform number of virtual-memory addresses. When the execution of software requires more pages of virtual memory than can be stored within RAM 258, pages that are not currently needed are swapped with the required pages, which are stored within non-volatile storage devices 62 or 64. RAM 258 is a type of memory designed such that the location of data stored in it is independent of the content. Also, any location in RAM 258 can be accessed directly without needing to start from the beginning.

Hard-disk drive 64 and diskette drive 62 are electromechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from server computer 22. A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or microfloppy disk (e.g., 3.5 inch) is encased in a protective plastic jacket. But, any size of disk could be used. A hard disk, which is very finely machined, is typically enclosed in a rigid case and can be exposed only in a dust free environment.

Keyboard/pointing-device controller 284 interfaces server computer 22 with keyboard 40 and graphical-pointing device 42. In an alternative embodiment, keyboard 116 and graphical-pointing device 118 have separate controllers. Display adapter 270 translates graphics data from CPU 226 into video signals utilized to drive display device 38 .

Finally, server computer 22 includes network adapter 285, Serial Storage Architecture (SSA) Adapter 287, and parallel-port adapter 276, which facilitate communication between computer system 110 and peripheral devices or other computer systems. Parallel-port adapter 276 transmits printer-control signals to a printer through a parallel port. Network adapter 285 connects server computer system 22 to a local area network (LAN). A LAN provides a user of server computer 22 with a means of electronically communicating information, including software, with another remote computer within computing environment 20 . In addition, a LAN supports distributed processing, which enables server computer to share a task with other computer systems linked to the LAN.

SSA adapter 287 enables server computer 22 to be part of a storage area network (SAN), such as SSA. As described previously, SSA is a high-performance serial interface designed to connect disk drives, optical drives, tape drives, CD-ROMS, printers, scanners and other peripherals to personal computers, workstations, server computers, and storage subsystems. SSA offers superior performance over other common interfaces (e.g., SCSI) in use today. Only 4 signals wires are required in SSA, compared to 68 for the closest SCSI equivalent. Each SSA link is full-duplex and frame multiplexed simultaneously, resulting in data rates of approximately 20 MB/sec in each direction, with total throughput of 80 MB/sec at each node. As many as 127 devices can be connected in each SSA loop, with "hot-plugging" supported. When SSA devices (such as server computer 22, and storage device enclosure 26) are configured in a loop, alternate paths to each device ensure that there is no single point of failure.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored oh non-writable storage media (e.g., read-only memory devices within a computer such as CD-ROM disks readable by CD-ROM drive 66); (b) alterable information stored on writable storage media (e.g., floppy disks within diskette drive 62 or hard-disk drive 64); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
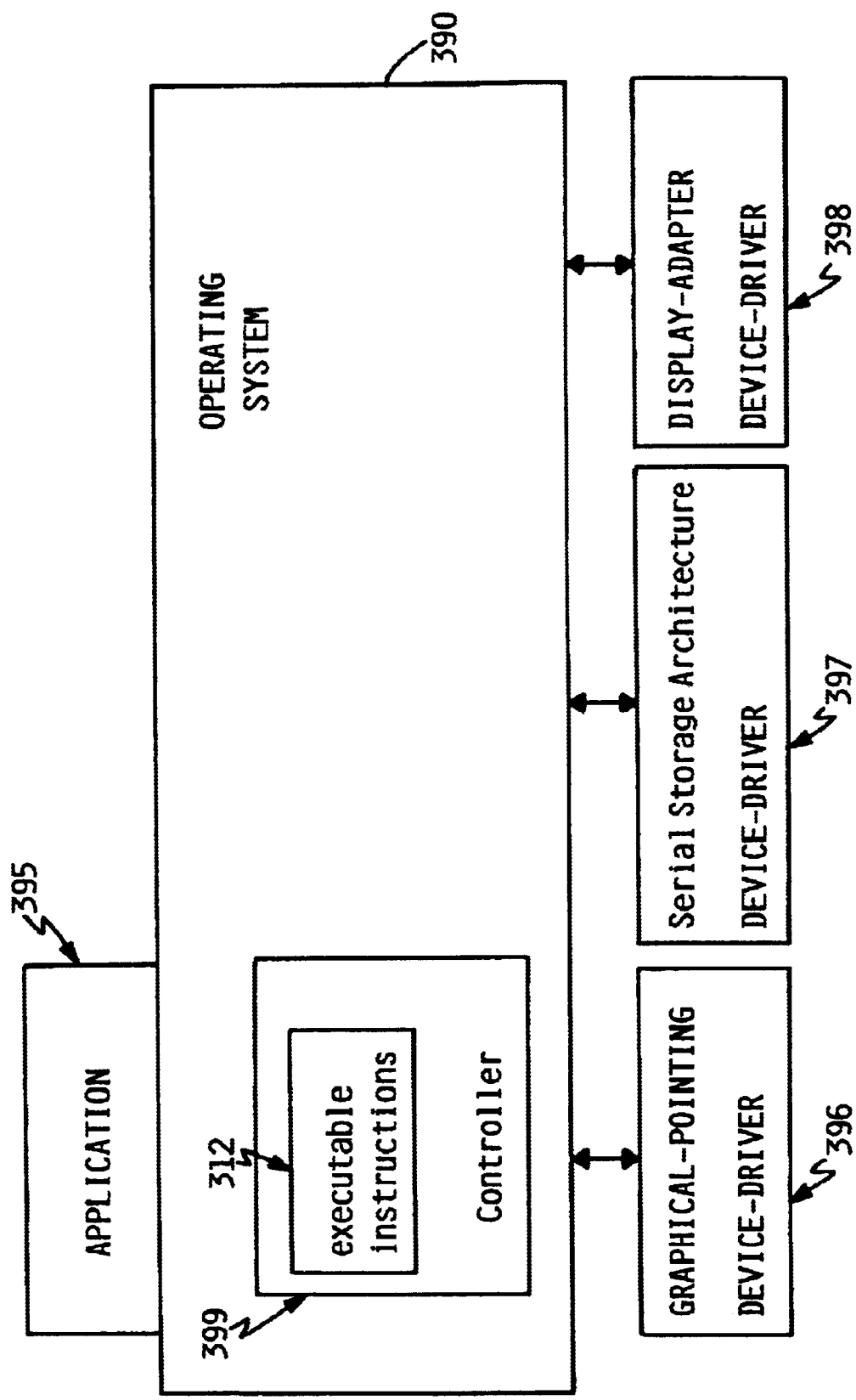
FIG. 3 is a block diagram of software stored within the memory of the server computer depicted in FIG. 1.

With reference now to FIG. 3, there is illustrated a block-diagram representation of the software configuration of server computer 22. As noted above, the software executed by server computer 22 can be stored within one or more of RAM 258, the nonvolatile storage provided by diskette drive 62, hard-disk drive 64, CD-ROM drive 66, or a remote server accessible via modem (not shown) or network adapter 285.

As illustrated, the software configuration of server computer 22 includes operating system 390, which is responsible for directing the operation of server computer 22. For example, operating system 390 typically includes computer software for controlling the allocation and usage of hardware resources such as memory, CPU time, disk space, and peripheral devices. Other technologies could also be utilized, such as touch-screen technology or human-voice control. The operating system is the foundation upon which applications 395 are built.

Referring again to FIG. 3, operating system 390 also includes controller 399. Controller 399 contains executable instructions 312. Although controller 399 is drawn as being included in operating system 390, it could be packaged separately from the operating system. CPU 226 is suitably programmed to carry out the preferred embodiment by executable instructions 312, as described in more detail in the flowchart of FIG. 6. In the alternative, the functions of FIG. 6 could be implemented by control circuitry through the use of logic gates, programmable-logic devices, or other hardware components in lieu of a processor-based system.

Operating system 390 communicates with applications 395 through messages conforming to the syntax of the application-program interface (API) supported by operating system 390. Operating system 390 further communicates with graphical-pointing device-driver 396, serial storage architecture (SSA) device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392. Also, operating system 390 sends control codes and data to SSA device-driver 397, which in turn relays instructions and data to storage device enclosure 26.

Figure 4:
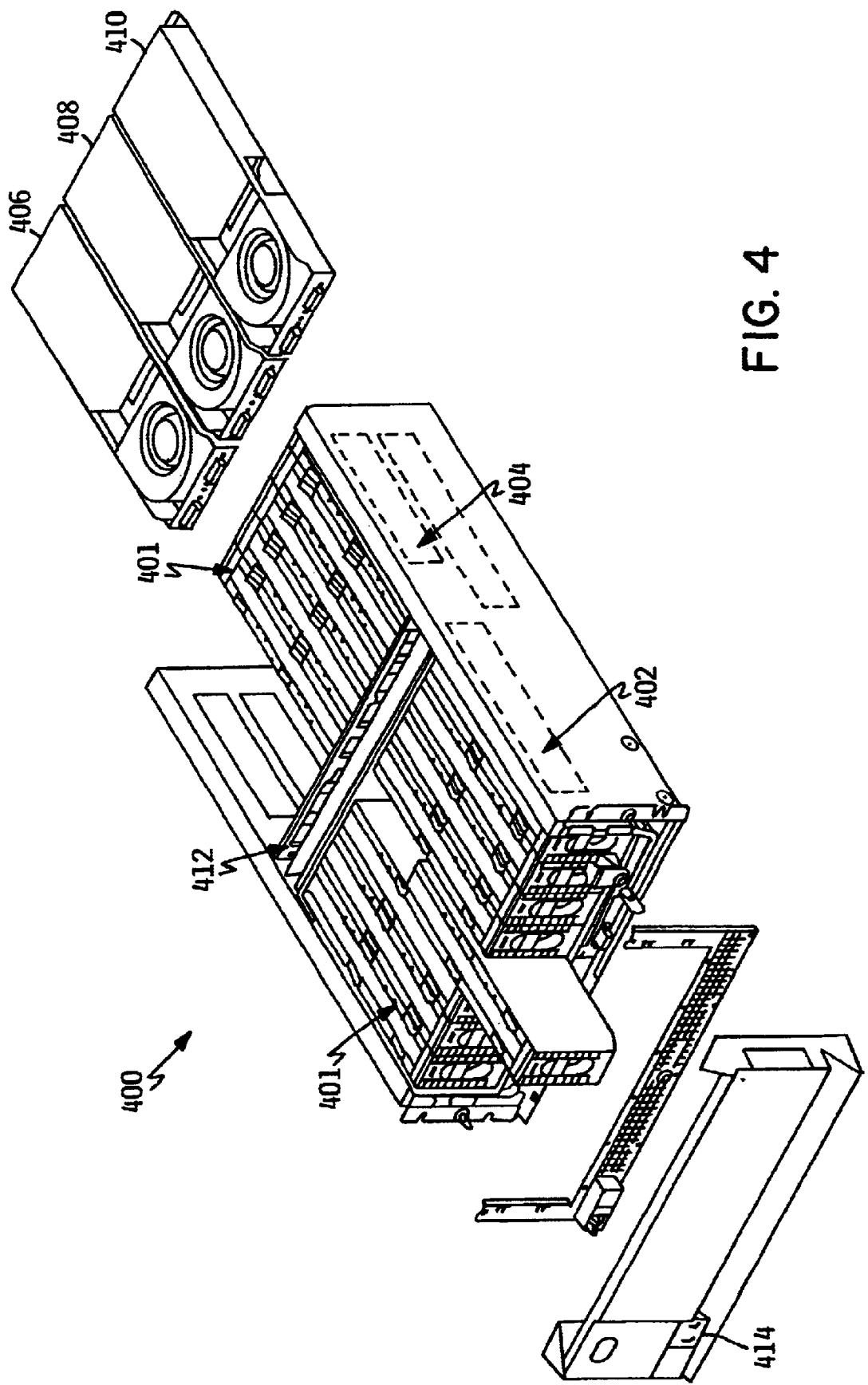
FIG. 4 is an exploded illustration of a first embodiment of a storage device enclosure.

FIG. 4 is an exploded illustration of a first physical embodiment of storage device enclosure 26, where the storage device enclosure is a drawer designed for integration into a standard 19 inch component rack, shown generally at 400. The illustrated storage device enclosure 400 includes up to sixteen storage device modules 401, up to eight storage device modules 401 mounted in the front of the enclosure, and up to eight storage device modules 401 mounted in the back of storage device enclosure 400. Drive capacities of the storage device modules can be intermixed. The illustrated embodiment features redundant power supplies 402 and 404 and fans 406, 408 and 410 that can be replaced without impacting system operation. A controller card assembly 412 controls the operation of storage device enclosure 400. An operator panel 414 is used to monitor the operation of storage device enclosures 400.

Figure 5:
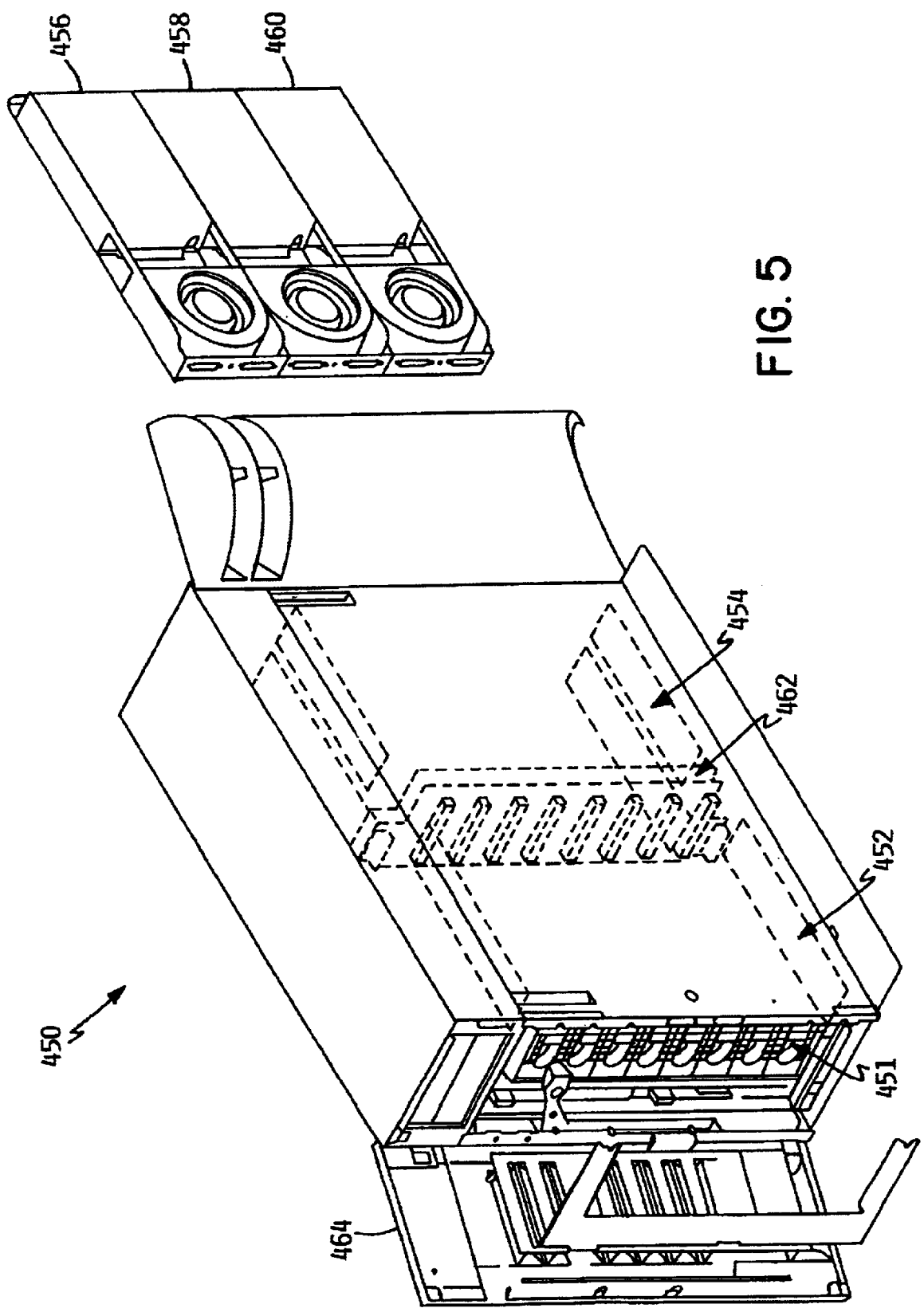
FIG. 5 is an exploded illustration of a second embodiment of a storage device enclosure.

FIG. 5 is an exploded illustration of a second physical embodiment of storage device enclosure 26, where the storage device enclosure is a free standing deskside tower unit, shown generally at 450. The illustrated storage device enclosure 450 includes up to sixteen storage device modules 451, up to eight storage device modules 451 mounted in the front of the storage device enclosure, and up to eight storage device modules 451 mounted in the back of the storage device enclosure. Drive capacities of storage device modules 451 can be intermixed. The illustrated embodiment features:redundant power supplies 452 and 454 and fans 456, 458 and 460 that can be replaced without impacting system operation. A controller card assembly 462 controls the operation of storage device enclosure 450. An operator panel 464 is used to monitor the operation of storage device enclosure 450.

The storage device enclosures of FIGS. 4 and 5 are merely illustrative of two embodiments of high capacity storage device enclosures compatible with the claimed invention. Alternative storage device enclosures containing a wide variety of storage media types (e.g., hard drive storage, optical storage, tape storage, etc.) and capacities of storage media can also operate within the scope of the claimed invention.

Figure 6:
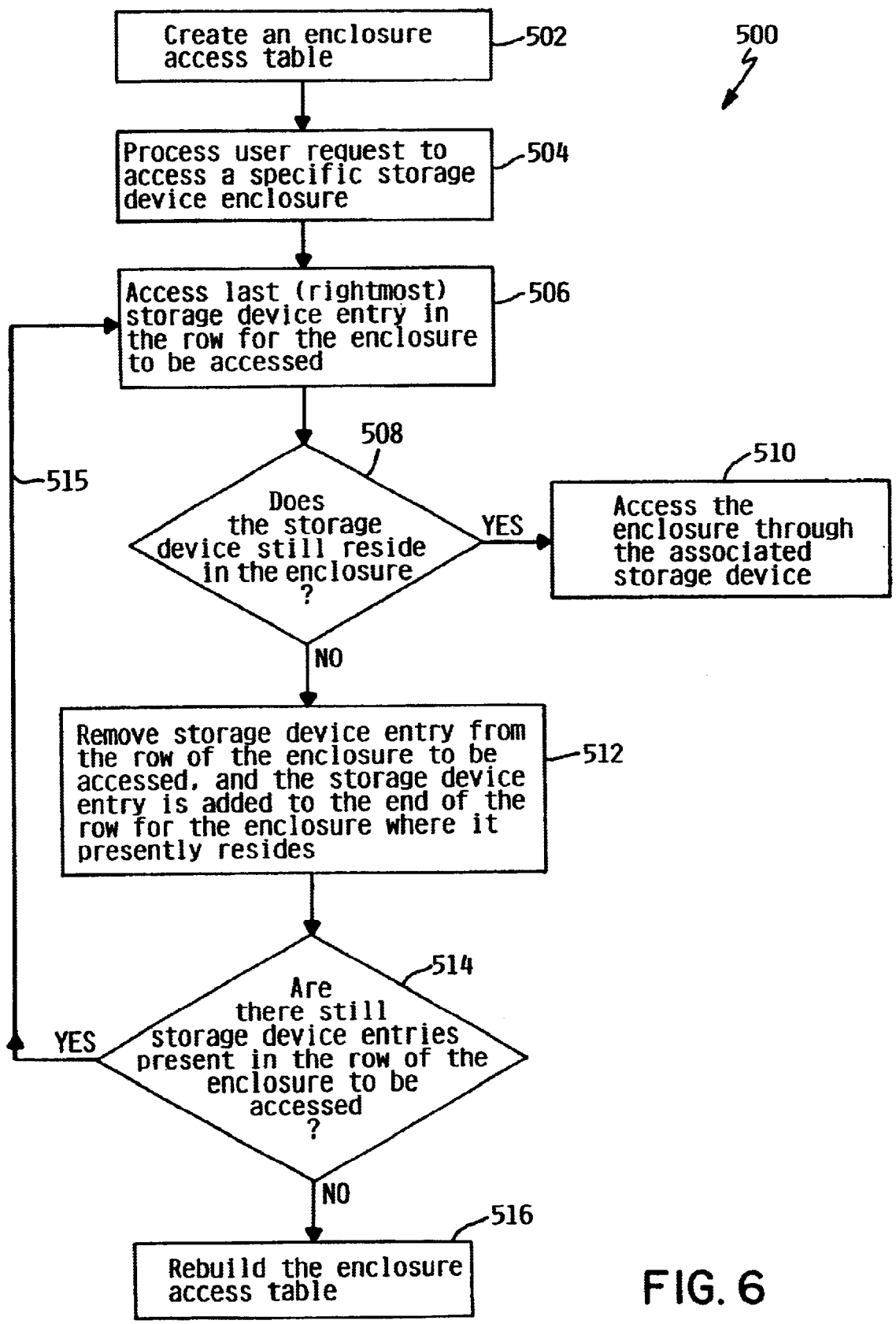
FIG. 6 is a flow chart representing a method for determining which storage devices reside in a user specified storage device enclosure, when the storage device enclosure itself cannot be directly addressed.

FIG. 6 illustrates a flow chart representing a method for determining which storage device modules (FIG. 1, element 34) reside within a specific storage device enclosure 26, when the storage device enclosure itself cannot be directly addressed, shown generally at 500. The method begins at block 502 where controller 399 creates an enclosure access table, as described in greater detail in FIG. 7. Enclosure access table represents the relationship between storage device enclosures 26 and the storage devices modules 34 that reside therein. The enclosure access table includes one entry for each storage device enclosure 26 residing within computing environment 20. Each storage device enclosure entry includes a plurality of storage device name entries corresponding to the storage device modules 34 which physically reside within storage device enclosure 26. Since storage device enclosures 34 cannot be queried directly to determine the specific storage device modules 34 residing within the enclosure, controller 399 queries each storage device module 34 in order to determine in which storage device enclosure 26 it resides. After each storage device module 34 has been queried, a storage device name entry corresponding to the storage device module 34 is added to the corresponding storage device enclosure entry within the enclosure access table. Thus, even though storage device enclosures 26 cannot be queried directly for the identify of storage device modules 34 residing therein the identity of storage device modules 34 residing within a specific storage device enclosure 26 may be determined by searching the enclosure access table.

At block 504, controller 399 processes a request issued by an operator or automated process on server computer 22 to access a specific storage device enclosure 26. Operators/server computers periodically require access to a specific storage device enclosure 26 in order to continuously monitor operational characteristics of storage device enclosure 26 such as internal temperature, fan status, power supply status, and storage device slot status. But, an operator/server computer can only access storage device enclosure 26 indirectly via a storage device module 34 residing within storage device enclosure 26. Enclosure access table 550 created at block 502 contains a representation of which storage device modules 34 reside within each storage device enclosure 26. But, the table representation of which storage device modules 34 reside within a specific storage device enclosure 26 at a specific time-may not be completely accurate. In fact, when a topology change occurs within the storage device enclosures (i.e., a storage device module 34 is added to storage device enclosure 26, removed from storage device enclosure 26, or malfunctions within storage device enclosure 26), the changes are not reflected within the enclosure access table, since the rebuild of the enclosure access table is computationally too expensive upon each topology change.

As a result, the preferred embodiment offers a method for the probabilistic determination of which storage device modules 34 are most likely to reside within a specific storage device enclosure 26. The preferred embodiment operates under the principle that the last storage device module 34 accessed within storage device enclosure 26 is the most likely candidate to still remain within the storage device enclosure. Thus, at block 506, the storage device entry corresponding to the most recently accessed storage device module 34 within storage device enclosure 26 is retrieved from the enclosure access table in order to communicate with the storage device enclosure.

At decision block 508, storage device module 34 identified at block 506 is queried in order to determine whether the storage device module still resides within the specified storage device enclosure. If storage device module 34 still resides within the specified storage device enclosure 26, the specified storage device enclosure is accessed via storage device module 34, as shown at block 510. If storage device module 34 no longer resides within the specified storage device enclosure 26, the storage device entry is removed from the current storage device enclosure entry in the enclosure access table, and is added to the storage device enclosure entry where it now resides, as shown at block 512.

At decision block 514, if there are still storage device entries present on the user specified storage device enclosure entry, the next most recently accessed storage device entry is retrieved from the enclosure access table, and steps 506 to 514 are repeated until a storage device entry is found which still resides within the specified storage device enclosure 26, or, alternatively, no more storage device entries remain within the storage device enclosure entry. If none of the storage device entries on the storage device enclosure entry are determined to reside within the specified storage device enclosure, the enclosure access table is rebuilt, as shown at block 516.

Figure 7C:
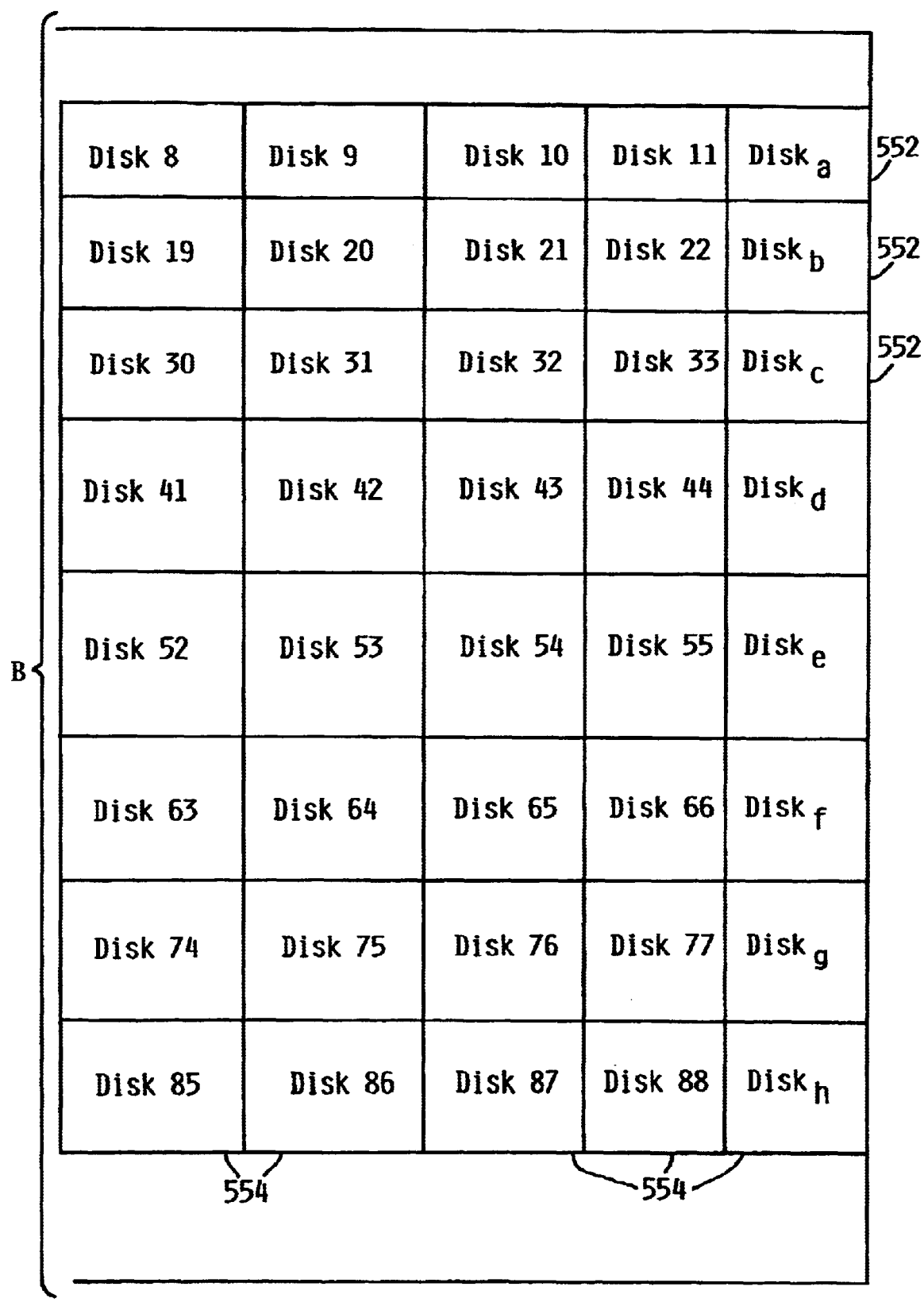
FIG. 7 is an illustration of an enclosure access table used by the preferred embodiment for the probabilistic determination of which storage devices reside in a user specified storage device enclosure.

FIG. 7 illustrates an enclosure access table 550 used by the preferred embodiment to determine which storage device modules 34 reside within a user specified storage device enclosure 26. Enclosure access table 550 includes one entry 552 (i.e., table row) corresponding to each storage device enclosure 26 present within computing environment 20. Each storage device enclosure entry 552 includes a plurality of storage device entries 554 corresponding to the storage device modules 34 residing within storage device enclosure 26. The ordering of storage device entries 554 within each storage device enclosure entry 552 does not correspond to the physical orientation of the storage device modules 34 within storage device enclosure 26. Rather, the ordering of storage device entries is dependent upon when the storage device was last accessed. For example, the most recently accessed storage device entries are located at the rightmost end of each storage device enclosure entry. The number of storage device entries 554 within each storage device enclosure entry 552 can vary from enclosure to enclosure.

Server computer 22 initially constructs enclosure access table 550 by individually querying each storage device module 34 within computing environment 20 in order to determine in which storage device enclosure 26 the storage device module 34 resides. Since storage device enclosures 26 can only be indirectly accessed though storage device modules 34 residing within the storage device enclosure, enclosure access table 550 provides an efficient mechanism for a server computer/user to determine which storage device modules 34 reside within a specific storage device enclosure 26.

Constructing enclosure access table 550 is computationally expensive, since each storage device module 34 residing within computing environment 20 must be queried, and each query operation may consume several seconds. For this reason, the enclosure access table 550 is not rebuilt upon each storage device topology change within the computing environment 550. As a result, enclosure access table 550 does not always accurately reflect the actual storage device topology within computing environment at a given time. However, enclosure access table 550 provides a list of likely candidates of storage device modules 34 that reside within a specific:storage device enclosure 26. In other words, enclosure access table 550 enables the claimed invention to make an "educated guess" as to the actual storage device topology of computing environment 20. The preferred embodiment takes advantage of these likely candidates to quickly determine a storage device module 34 via which a server computer/user can communicate with a specific storage device enclosure 26.

If a computer system/user attempts to access a specific storage device enclosure 26 via a "likely candidate" storage device module 34, and if the storage device module 34 is determined to no longer physically reside within the specified storage device enclosure 26, the storage device entry 554 is removed from the specified storage device enclosure entry 552 and is added to the end of the storage device enclosure entry 552 (i.e., the rightmost end of the storage device enclosure entry) where it now resides. In this way, storage device entries 554 residing on the end of storage device enclosure entries 552 become the most likely candidates to still be present within the actual storage device enclosures 26, since they were most recently accessed. In this way, enclosure access table 550 is updated incrementally upon user queries, rather than completely rebuilt upon each topology change within the computing environment.

Figures 1, 8A:
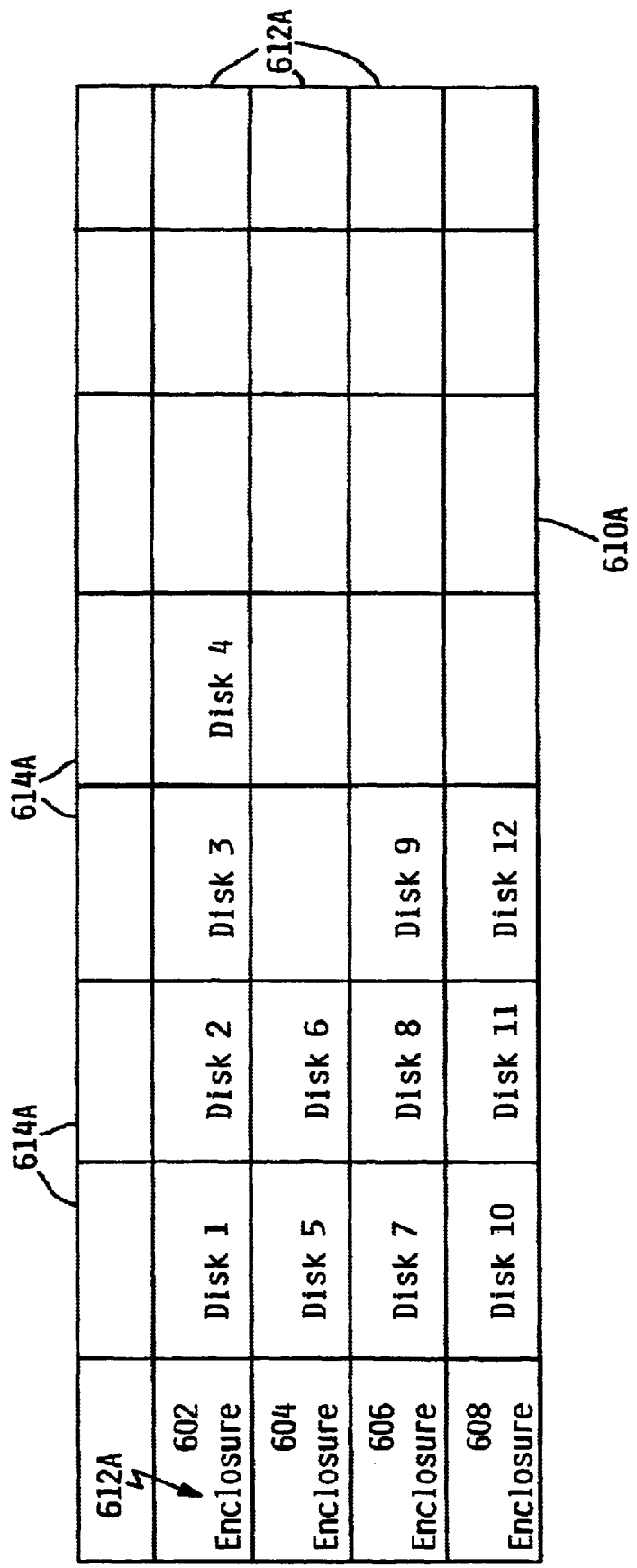
FIGS. 8A and 8B respectively illustrate an initial configuration of a plurality of storage device enclosures (and a corresponding storage device enclosure table), and a subsequent configuration of the storage device enclosures after a topology change (and the corresponding storage device enclosure table).
Figures 2, 8A:
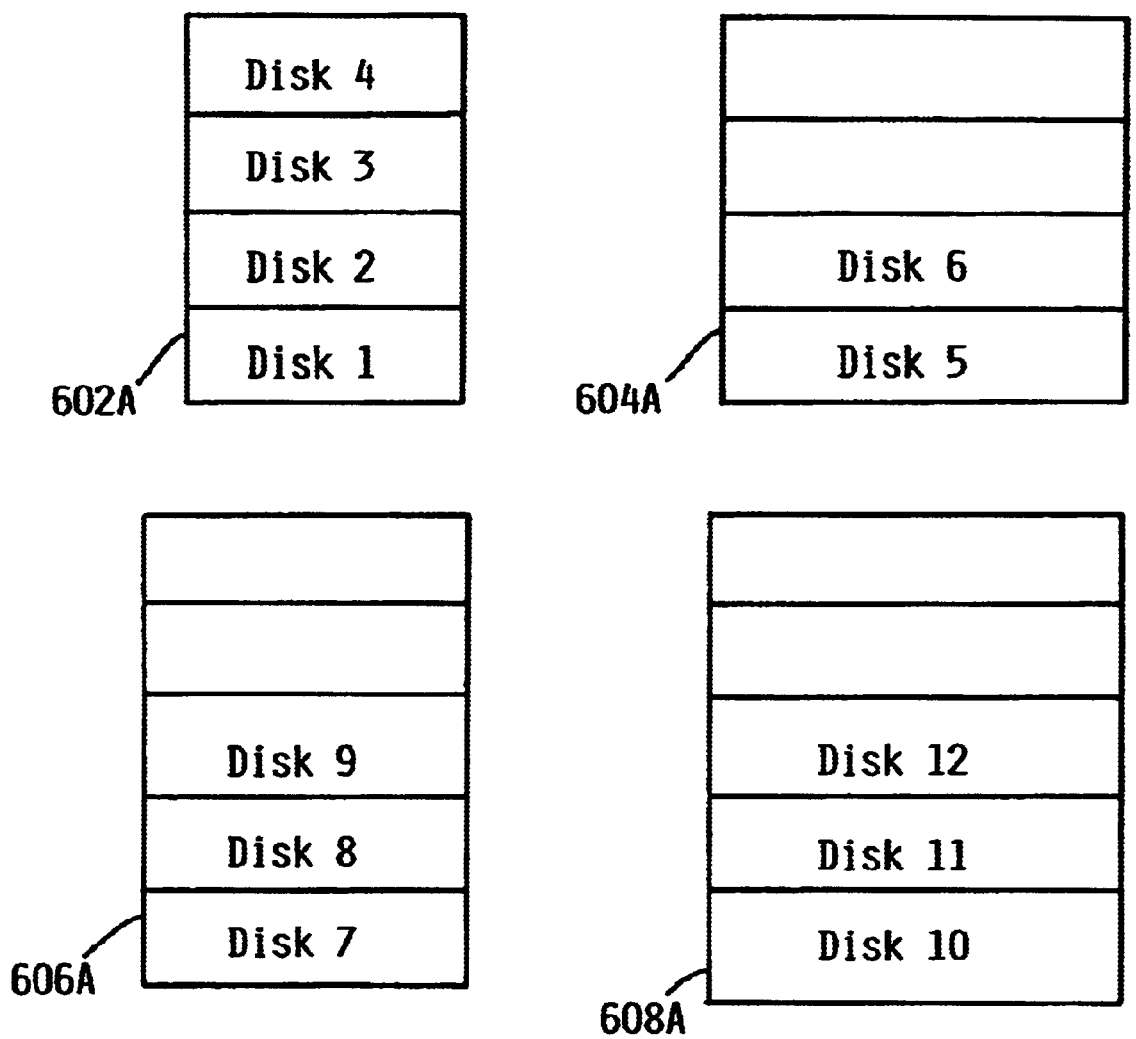
Figures 1, 8B:
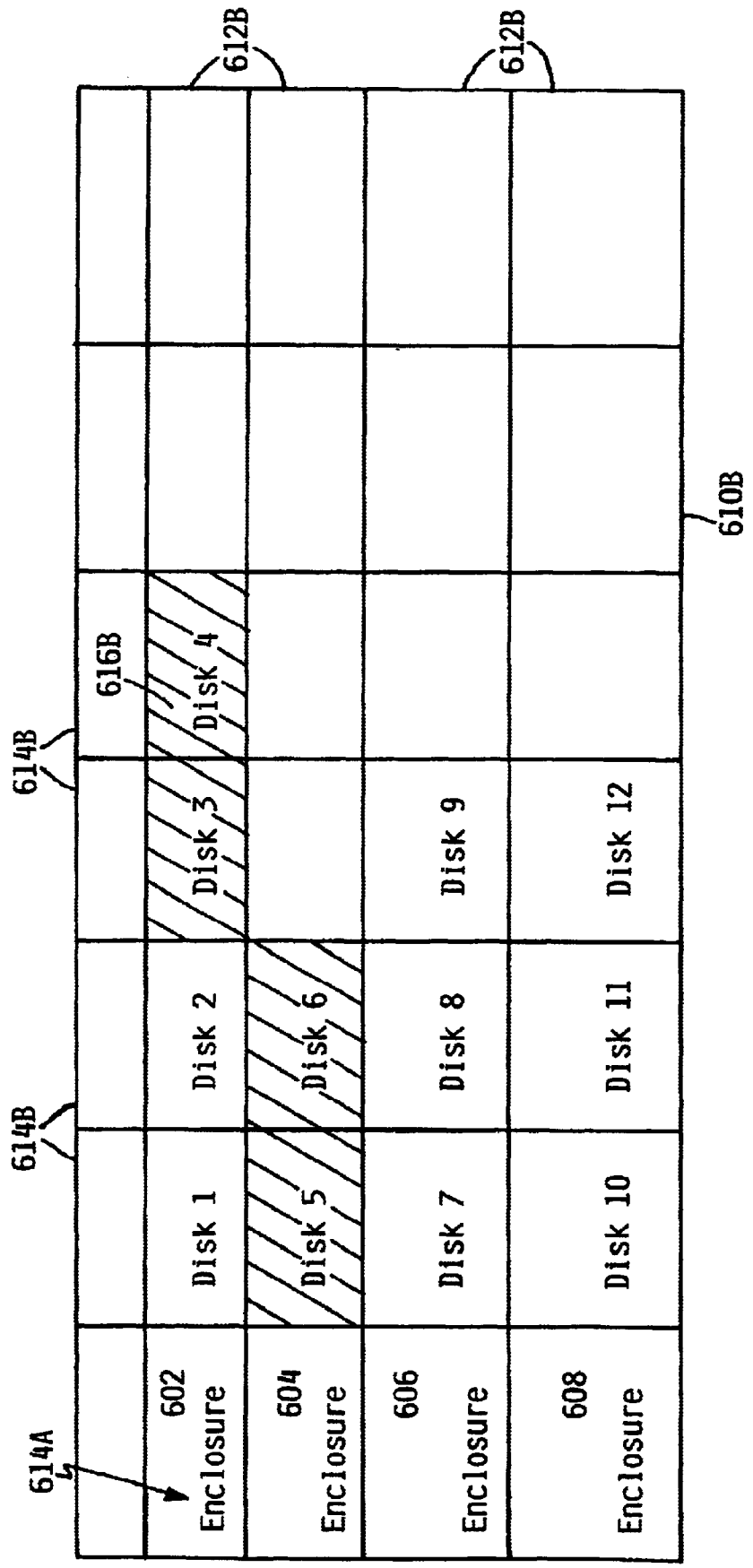
Figures 2, 8B:
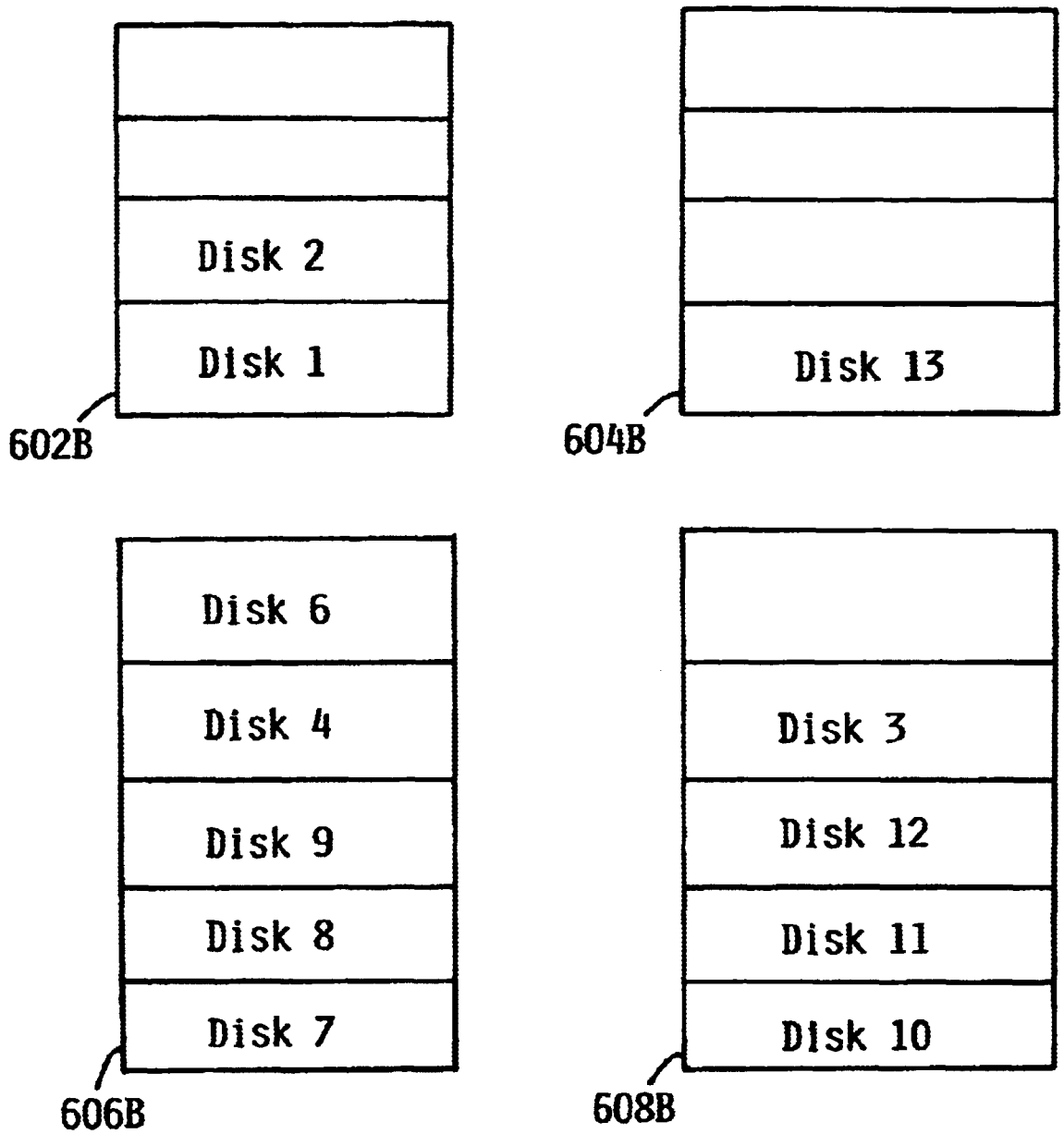

FIGS. 8A and 8B respectively illustrate an initial example configuration of a plurality of storage device enclosures (and a corresponding storage device enclosure table) within a computing environment, and a subsequent configuration of the storage device enclosures within the computing environment after a topology change has been applied (and a corresponding storage device enclosure table).

In the initial configuration of FIG. 8A, storage device enclosure 602A contains storage device modules. "disk 1", "disk 2", "disk 3", and "disk 4". Storage device enclosure 604A contains storage device modules "disk 5" and "disk 6". Storage device enclosure 606A contains storage: device modules "disk 7", "disk 8" and "disk 9". Finally, storage device enclosure 608A contains storage device modules "disk 10", "disk 1" and "disk 12". Enclosure access table 610A contains one entry (e.g., row) 612A for each storage device enclosure 602A, 604A, 606A and 608A. Each storage device enclosure entry 612A includes a list of storage device entries 614A corresponding to the storage device modules present within storage device enclosures 602A, 604A, 606A, and 608A. FIG. 8A illustrates a scenario where storage device enclosure access table 610A has just been built. In this instance, storage device enclosure access table 610A accurately reflects the current configuration of storage device modules within the actual storage device enclosures 602A, 604A, 606A, and 608A.

In FIG. 8B, several topology changes have occurred within the storage device enclosures, as reflected by the updated storage device enclosures shown at 602B, 604B, 606B and 608B. As illustrated, "disk 3" has been moved from storage device enclosure 602B to storage device enclosure 608B. Disk 4 has been moved from storage device enclosure 602B to storage device enclosure 606B. "Disk 5" from storage device enclosure 604B has been completely removed from the computing environment. "Disk 6" from storage device enclosure 604B has been moved to storage device enclosure 606B. Finally, a new storage device module ("disk 13") has been added to storage device enclosure 604B.

Even though several topology changes have occurred within the computing environment, enclosure access table 610B remains unchanged (i.e., enclosure access tables 610A and 610B are identical) upon completion of the topology changes. Thus, enclosure access table 610B no longer accurately represents the topology of the physical storage device enclosures 602B, 604B, 606B and 608B (the inaccurate entries are reflected by the shaded region indicated at 616B). However, there is still some correlation between the storage device entries in the enclosure access table 610B and the actual topology of storage device enclosures 602B, 604B, 606B, and 608B. The claimed invention relies on this correlation in order to predict which storage devices are most likely to still reside within the a specific disk enclosure.

Figure 9A:
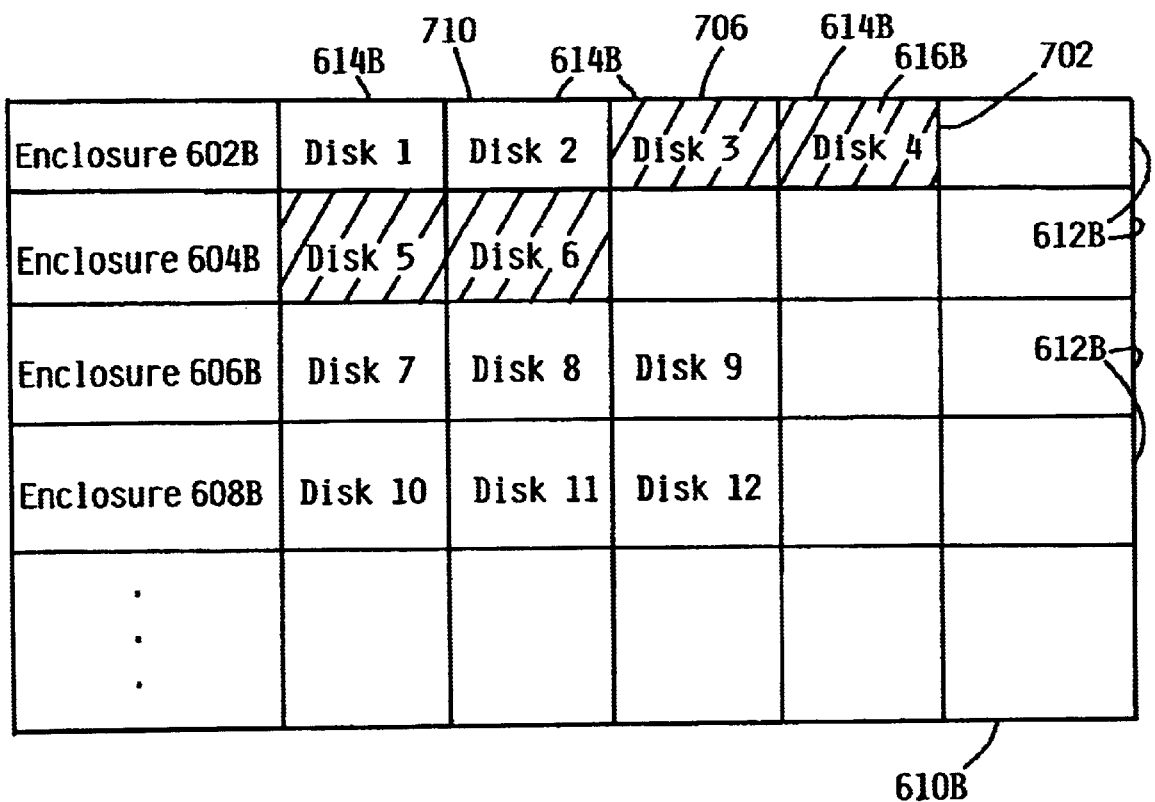
FIGS. 9A, 9B, and 9C illustrate three user request examples to access storage device enclosures 1, 2 and 3, respectively, after the topology change illustrated in FIG. 8B.
Figure 1:
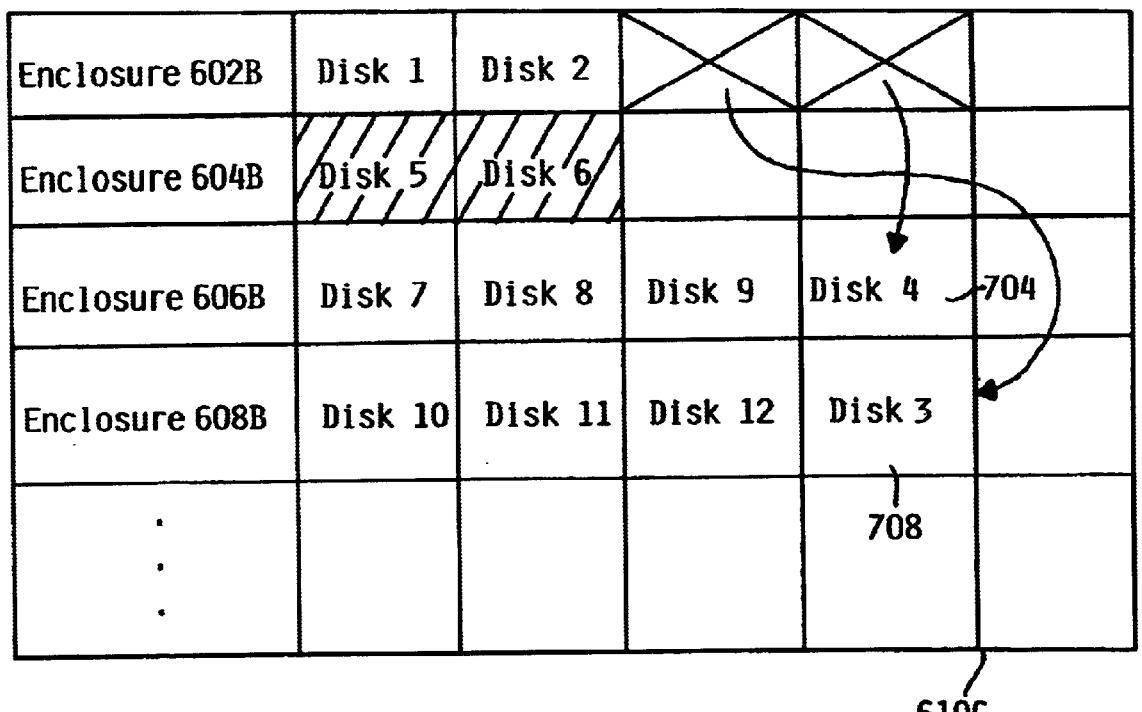
Figures 2, 9A:
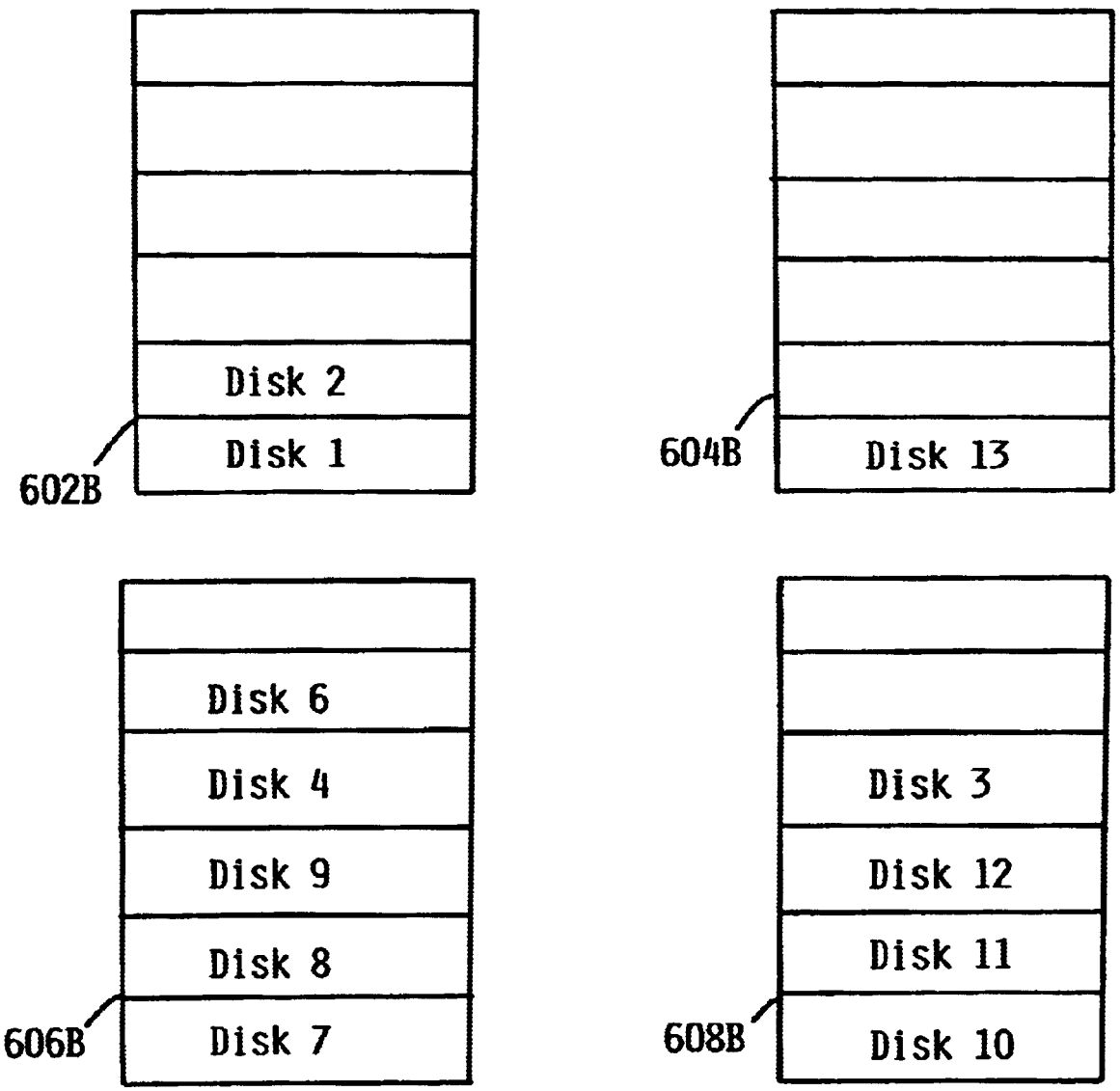
Figures 1, 9B:
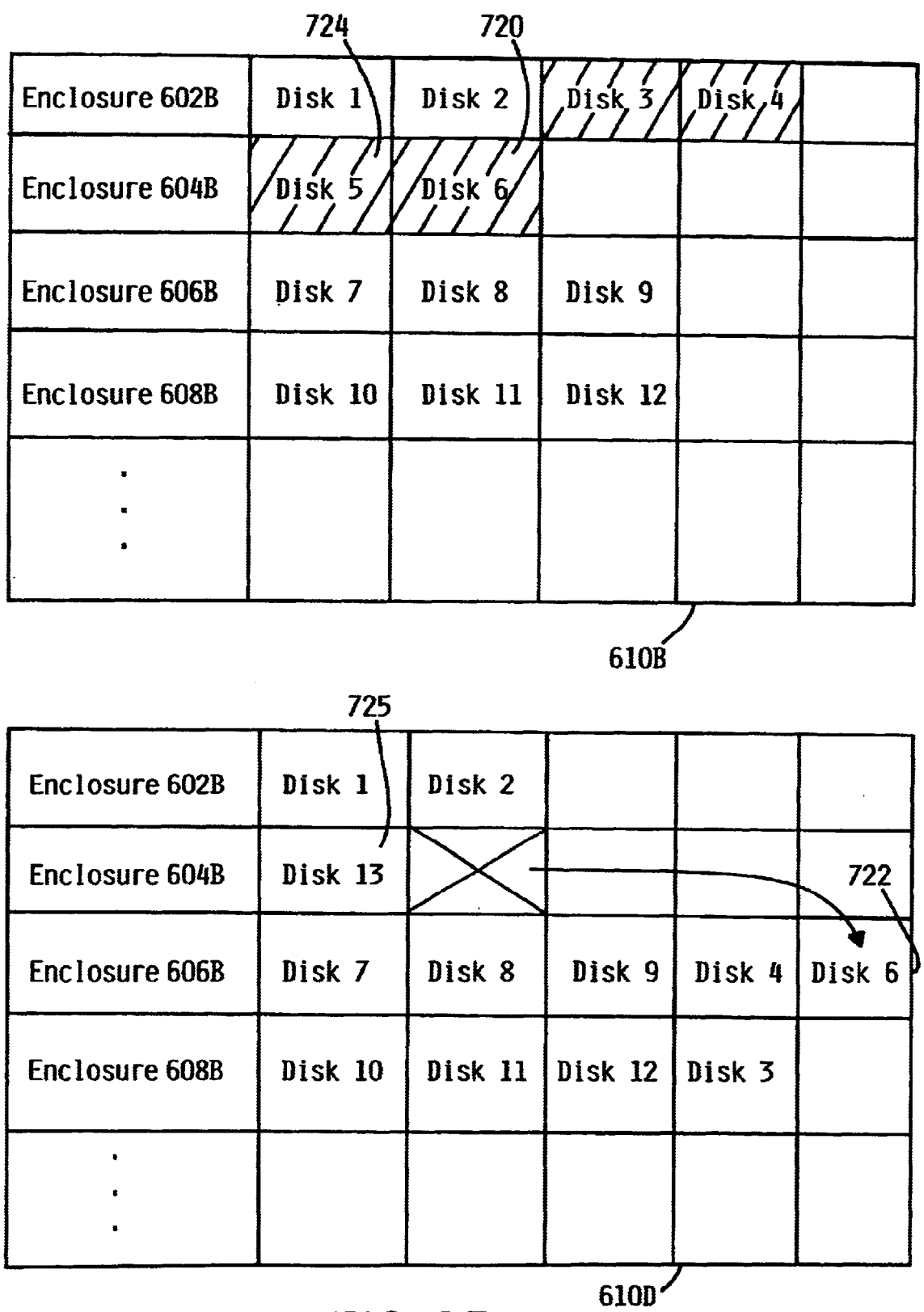
Figures 2, 9B:
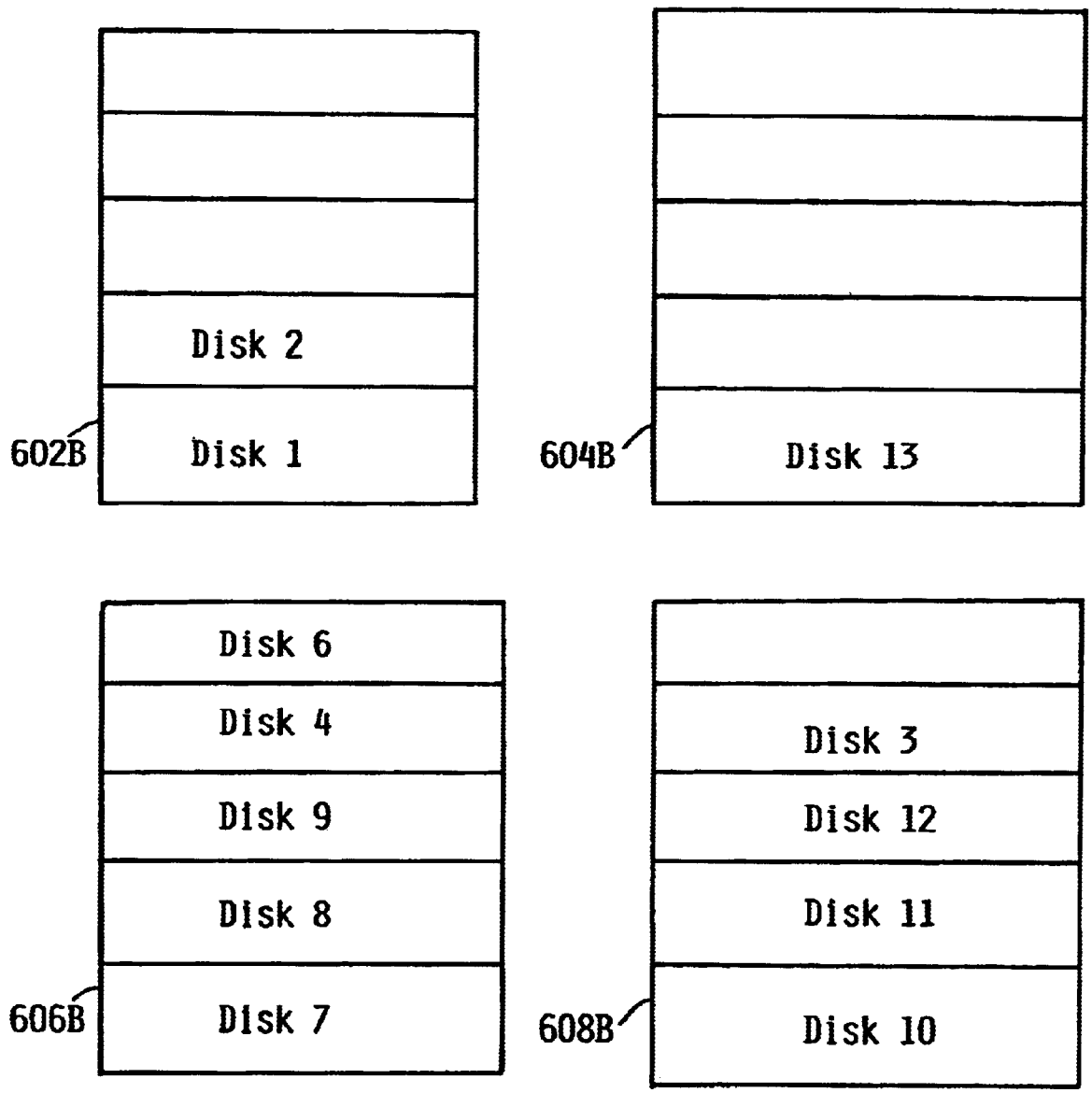
Figures 2, 9C:
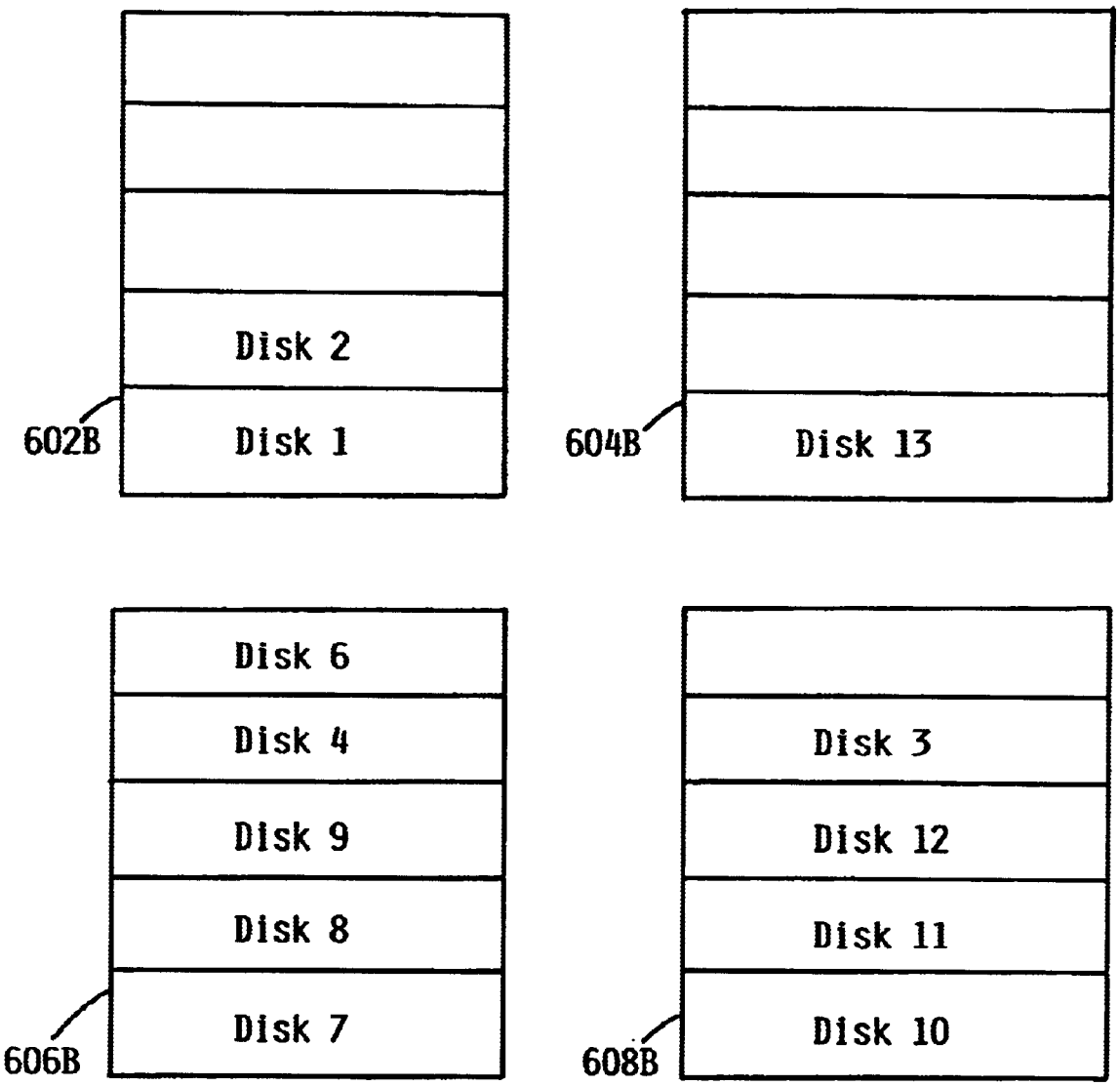

FIGS. 9A, 9B, and 9C illustrate three separate examples of user requests to access storage device enclosures 602B, 604B and 606B, respectively, after the topology change illustrated in FIG. 8B. All three examples use enclosure access table. 610B (as previously illustrated in FIG. 8B) as the starting reference point. Changes to enclosure access table 610B performed as a result of each user request are reflected in revised enclosure access tables 610C, 610D, and 610E, respectively.

In the first example (i.e., FIG. 9A), an operator request is issued by a user to access enclosure 602B. In the preferred embodiment, the operator request to access storage device enclosure 602B is received, and the last (rightmost) storage device entry in the storage device enclosure 602B entry from the enclosure access table is retrieved (e.g. "disk 4" shown at 702). "Disk 4" is queried to determine if it still resides within storage device enclosure 602B. In this instance, "disk 4" was moved from enclosure 602B to enclosure 606B, as previously illustrated in FIG. 8B. Since "disk 4" no longer resides within storage device enclosure 602B, the storage device entry for "disk 4" is removed from the storage device enclosure 602B entry, and a new storage device entry corresponding to "disk 4" is added to the rightmost end of the entry for storage device enclosure 606, as shown in revised enclosure access table 610C at reference FIG. 704.

Referring back to the enclosure access table 610B, it is next determined whether there are still storage device entries present for the storage device enclosure 602B entry. In this instance, there are still storage device entries remaining (i.e., "disk 3", "disk 2" and "disk 1") on the storage device enclosure 602B entry. The new rightmost (i.e., last) storage device entry is retrieved (i.e., "disk 3" shown at 706). "Disk 3" is then queried to determine if it still resides within storage device enclosure 602B. In this instance, "disk 3" has been moved to storage device enclosure 608B from storage device enclosure 602B, as previously illustrated in FIG. 8B. Since "disk 3" no longer resides within storage device enclosure 602B, the storage device entry for "disk 3" is removed from the storage device enclosure 602B entry, and a new storage device entry corresponding to "disk 3" is added to the rightmost end of the entry for storage device enclosure 608B, as shown in revised enclosure access table 610C at reference FIG. 708.

Referring back to enclosure access table 610B, it is determined whether there are still storage device entries present within the storage device enclosure 602B entry. In this instance, there are still storage device entries remaining (i.e., "disk 2" and "disk 1") for the storage device enclosure 602B entry. The new rightmost (i.e., last) storage device entry is retrieved (i.e., "disk 2", as shown at 710). "Disk 2" is then queried to determine if it still resides within storage device enclosure 602B. In this instance, "disk 2" still resides within storage device enclosure 602B. Thus, storage device enclosure 602B can be accessed by the user/server computer via "disk 2". Thus, as a result of the operator query, enclosure access table 610B has been updated as shown in revised enclosure access table 610C. While revised enclosure access table 610C does not reflect the contents of storage device enclosures 602B, 604B, 606B, and 608B with complete accuracy, it correlates more closely with the actual contents of the storage device enclosures than does enclosure access table 610B.

In the second example (i.e., FIG. 9B), an operator request is issued by a server computer/user to access enclosure 604B. In the preferred embodiment, the operator request to access storage device enclosure 604B is received, and the last (rightmost) storage device entry in the storage device enclosure 604B entry from enclosure access table 610D is retrieved (e.g., "disk 6", as shown at 720). "Disk 6" is queried to determine if it still resides within storage device enclosure 604B. In this instance, "disk 6" was moved from enclosure 604B to enclosure 606B, as previously illustrated in FIG. 8B. Since "disk 6" no longer resides within storage device enclosure 604B, the storage device entry for "disk 6" is removed from the storage device enclosure 604 entry, and a new storage device entry corresponding to "disk 6" is added to the rightmost end of the entry for storage device enclosure 606, as shown in enclosure access table 610D at reference element 722.

Next, it is determined whether there are still storage device entries present in the storage device enclosure 604B entry within enclosure access table 610D. In this instance, there is still one storage device entry remaining (i.e., "disk 5") on the storage device enclosure entry. The new rightmost (i.e., last) storage device entry is retrieved (i.e., "disk 5" shown at 724). "Disk 5" is then queried to determine if it still resides within storage device enclosure 604B. In this instance, "disk 5" has been removed from storage device enclosure 604B, as previously illustrated in FIG. 8B. Since "disk 5" no longer resides within storage device enclosure 604, the storage device entry for "disk 5" is removed from the storage device enclosure 604B entry.

Once again, it is determined wither there are still storage device entries present in the storage device enclosure 604B entry within enclosure access table 610D. In this instance, there are no storage device entries remaining for the storage device enclosure 604B entry. Thus, the list of potential candidate storage devices has been exhausted, and enclosure access table 610D must be completely rebuilt by querying every storage device within the computer system.

Upon the rebuild of enclosure access table 610D, the table is once again completely synchronized with the physical storage device enclosure/storage device relationship. As a result, the rebuilt enclosure access table contains "disk 13", which now resides within storage device enclosure 604B as shown at reference FIG. 725. Thus, a user accesses storage device enclosure 604B via "disk 13".

In the third example (i.e., FIG. 9C), a user request is issued by a user to access storage device enclosure 606B. In the preferred embodiment, the user request to access storage device enclosure 606B is received, and the last (rightmost) storage device entry within the storage device enclosure 606B entry from enclosure access table 610E is retrieved (e.g., "Disk 9"), as shown at FIG. 728. "Disk 9" is queried to determine if it still reside within storage device enclosure 606. In this instance, "disk 9" still resides within storage device enclosure 606, thus storage device enclosure 606 is accessible via "disk 9".

While this invention has been described with respect to the preferred and alternative embodiments, it will be understood by those skilled in the art that various changes in detail may be made therein without departing from the spirit, scope, and teaching of the invention. Accordingly, the herein disclosed invention is to be limited only as specified in the following claims.

What is claimed is:

1. A method for accessing one of a plurality of storage device enclosures in a storage system, wherein each storage device enclosure containing a plurality of storage devices, the method comprising the steps of:

creating a table representing initial storage device enclosure-to-storage device relationships, wherein the table is not rebuilt upon each storage device topology change within the storage system;

receiving a user request to access a specified storage device enclosure;

identifying, via the table, a storage device most likely to still reside within the specified storage device enclosure;

querying the identified storage device to determine whether the identified storage device still resides within the specified enclosure;

accessing the specified storage device enclosure via the identified storage device, when the identified storage device still resides within the specified storage device enclosure;

updating the table to reflect new location of the identified storage device, when the identified storage device does not reside within the specified enclosure; and rebuilding the table, when none of the identified storage devices resides in the specified storage device enclosure.

2. The method of claim 1, wherein the method step of updating the table to reflect the new location of the identified storage device further comprises the steps of:

removing the name entry for the identified storage device from the specified enclosure; and adding the name entry for the identified storage device to the end of the plurality of storage device names for the storage device enclosure identified as now holding the storage device.

3. The method of claim 1, wherein the method step of creating the table further comprises the steps of:

querying each of the plurality of storage devices within the storage system to determine in which storage device enclosure it resides; and adding one entry to the table for each storage device enclosure, the entry comprising:

the name of the storage device enclosure; and a plurality of storage device name entries corresponding to the storage devices currently residing within the storage device disclosure.

4. The method of claim 3, wherein the method step of identifying which storage device is most likely to still reside in the specified storage device enclosure further comprises the steps of:

searching the table for the storage device enclosure entry corresponding to the name of the enclosure specified by the user request;

determining the most recently added storage device name entry from the list of storage device names associated with the storage device enclosure entry; and returning the most recently added storage device name entry as the storage device most likely to reside in the specified storage device enclosure.

5. The method of claim 1, wherein the step of identifying, via the table, other storage devices likely to still reside in the storage device enclosure further comprises the steps of:

accessing a storage device enclosure entry corresponding to the user specified storage device enclosure query;

retrieving the most recently added storage device name entry associated with the storage device enclosure entry; and returning the name of the most recently added storage device name entry as the storage device most likely to still reside in the storage device enclosure.

6. A program product that, when read and executed by a computer, manages access to one or more storage device enclosures containing plurality of storage devices within a storage system, wherein the storage device enclosure can be accessed directly only via a storage device residing within the storage device enclosure, and wherein relationship between the one or more storage device enclosures and the plurality of storage devices is not precisely known, comprising:

a controller that determines which storage device is most likely to reside in a specified storage device enclosure by utilizing a table representing initial storage device enclosure-to-storage device relationships, wherein the table is not rebuilt upon each storage device topology change within the storage system; querying each of the plurality of storage devices within the storage system to determine in which storage device enclosure said queried storage device resides; and adding one entry to the table for each storage device enclosure; wherein the entry comprises identification of the storage device enclosure; and a plurality of storage device name entries corresponding to the storage devices currently residing within the storage device enclosure; and signal-bearing media bearing the controller.

7. The program product of claim 6, wherein the determination of which storage device is most likely to reside in a specified storage device enclosure comprises the steps of:

searching the table for a storage device enclosure entry corresponding to the name of the enclosure specified by the user request;

determining the most recently added storage device name entry from the list of storage device names associated with the storage device enclosure entry; and returning the most recently added storage device name entry as the storage device most likely to reside in the specified storage device enclosure.

8. A signal-bearing medium containing a program for accessing one of a plurality of storage device enclosures in a storage system, each storage device enclosure containing a plurality of storage devices, wherein the program, when read and executed by a computer, comprises steps to:

creating a table representing storage device enclosure-to-storage device relationships, wherein the table is not updated upon a topology change to the plurality of storage devices within the storage system;

receiving a user request to access a specified storage device enclosure;

identifying, via the table, the storage device most likely to still reside in the specified storage device enclosure;

querying the identified storage device to determine whether the identified storage device still resides within the specified enclosure;

when the identified storage device still resides within the specified enclosure, accessing the storage device enclosure via the identified storage device;

when the identified storage device does not reside within the specified enclosure:
updating the table to reflect the new location of the identified storage device;
when one of the indentified storage devices still resides in the specified storage device enclosure, accessing the specified storage device enclosure via the identified storage device; and
when none of the identified storage devices resides in the specified storage device enclosure, rebuilding the table.

9. A computer system, comprising:

a processor;

one or more storage device enclosures coupled to the processor;

plurality of storage devices residing within each of the storage device enclosures;

memory coupled to the processor; and a controller residing in the memory and executing on the processor, wherein the controller determines which storage device is most likely to reside in a user specified storage device enclosure by utilizing a table representing storage device enclosure-to-storage device relationships in order to determine which storage device is most likely to reside in a user specified storage device enclosure, wherein the table is not rebuilt upon each storage device topology change within the storage system, wherein the storage device enclosure can be accessed directly only via a storage device residing within the storage device enclosure, and wherein relationship between the one or more storage device enclosures and the plurality of storage devices is not precisely known.

10. The computer system of claim 9, wherein the controller's determination of which storage device is most likely to reside in a user specified storage device enclosure comprises the steps of:

searching the table for a storage device enclosure entry matching the user specified storage device enclosure;

determining the most recently added storage device name entry from a list of storage device names associated with the storage device enclosure entry; and returning the most recently added storage device name entry as the storage device most likely to reside in the specified storage device enclosure.

* * * * *